(12) United States Patent
Suzuki et al.

(10) Patent No.: US 8,519,593 B2
(45) Date of Patent: Aug. 27, 2013

(54) BRUSHLESS MOTOR WITH LOW COGGING TORQUE

(75) Inventors: Yuzuru Suzuki, Miyota-machi (JP); Yuuki Takahashi, Miyota-machi (JP)

(73) Assignee: Minebea Co., Ltd., Nagano (JP)

( * ) Notice: Subject to any disclaimer, the term of this patent is extended or adjusted under 35 U.S.C. 154(b) by 155 days.

(21) Appl. No.: 13/085,849

(22) Filed: Apr. 13, 2011

(65) Prior Publication Data
US 2011/0254402 A1   Oct. 20, 2011

(30) Foreign Application Priority Data
Apr. 15, 2010   (JP) ................. 2010-094128

(51) Int. Cl.
*H02K 1/06*      (2006.01)
*H02K 1/12*      (2006.01)

(52) U.S. Cl.
USPC ...... 310/216.094; 310/216.092; 310/216.111; 310/254.1

(58) Field of Classification Search
USPC ............. 310/216.094, 216.111, 49.53, 67 R, 310/162, 216.092, 254.1
See application file for complete search history.

(56) References Cited

U.S. PATENT DOCUMENTS

| 4,280,072 A | 7/1981 | Gotou et al. | |
| 5,289,064 A * | 2/1994 | Sakamoto | 310/49.53 |
| 5,912,515 A * | 6/1999 | Ackermann et al. | 310/67 R |
| 2004/0056557 A1 * | 3/2004 | Enomoto et al. | 310/218 |
| 2004/0245887 A1 * | 12/2004 | Fujinaka | 310/254 |
| 2005/0258700 A1 * | 11/2005 | Fratta | 310/162 |

FOREIGN PATENT DOCUMENTS

| EP | 709947 A2 | 5/1996 |
| JP | 58-042708 B | 9/1983 |
| JP | 01198264 A * | 8/1989 |
| JP | 08-214525 A1 | 8/1996 |

\* cited by examiner

*Primary Examiner* — Tran Nguyen
*Assistant Examiner* — Jose Gonzalez Quinones
(74) *Attorney, Agent, or Firm* — Oliff & Berridge, PLC

(57) ABSTRACT

A brushless DC motor provided with nine slots and eight poles includes a stator including a stator core having pole teeth on the outer circumference thereof and a coil wound around each pole tooth; a rotor disposed at an outside position of the outer circumference of the stator via a gap and having a multiply magnetized permanent magnet with plural magnetic poles; a pole tooth surface formed at a portion of the pole tooth and facing an inner circumference of the rotor; a recessed portion formed on the pole tooth surface; and a slot formed between the adjacent pole teeth and extending a first angular range around a rotational center of the rotor; in which the recessed portion extends in a second angular range around the rotational center of the rotor, the second angular range is 1.2 to 3.0 times the first angular range, the recessed portion has a radial depth which is 0.5% or more of an inner diameter of the permanent magnet, the pole tooth extends in a third angular range around a rotational center of the rotor, and the third angular range is 0.58 to 0.8 times a value which is obtained by dividing 360 degrees by the number of magnetic poles of the permanent magnet.

7 Claims, 8 Drawing Sheets

BRUSHLESS MOTOR WITH LOW COGGING TORQUE

RELATED APPLICATIONS

This application claims priority under 35 U.S.C. §119 to Japanese Patent Application No. 2010-094128 filed on Apr. 15, 2010, the entire content of which is hereby incorporated by reference.

BACKGROUND OF THE INVENTION

1. Field of the Invention

The present invention relates to a technique for stabilizing and minimizing a cogging torque which is generated in a brushless DC motor provided with nine slots and eight poles.

2. Description of the Related Art

The order of cogging toque is generally calculated by applying the least common multiple of numbers of slots and magnetic poles. When the degree is high, the cogging torque is small. As a technique relating to cogging torque, a technique disclosed in Japanese Examined Patent Application, Publication No. 58-42708, is known. In the disclosed structure, the cogging torque is reduced by auxiliary slots 15 formed on an auxiliary salient pole 14 and prime salient poles 12a and 12b. Furthermore, as a technique for avoiding vibration, Japanese Patent Application, First Publication No. 8-214525, discloses a technique applied to a permanent-magnet-type of a salient pole DC motor in which the net radial force between a rotor and a stator is reduced by balancing of the radial reluctance forces therebetween. In the technique, balancing of the radial reluctance is obtained by slotting at a pole face of a pole tip of the salient pole of the motor.

SUMMARY OF THE INVENTION

However, in the structure disclosed in Japanese Patent Examined Application, Publication No. 58-42708, the auxiliary salient pole is provided and is formed in the stator, so that a space for providing a stator coil is decreased. Therefore, applying the above structure to a motor having many slots is impossible.

According to the structure disclosed in Japanese Patent Application, First Publication No. 8-214525, the slot is formed in the pole face of the pole tip of the salient pole of the motor, so that the net radial force between the rotor and the stator is reduced by balancing of the radial reluctance forces between the rotor and the stator. Specifically, the circumferential width of the slot on the pole face of the pole tip is substantially the same as the circumferential distance between the adjacent edges of the pole tips, and the depth of the slot on the pole face of the magnetic pole is substantially the same as the radial distance of the radial gap. However, in this condition, vibration in the frequency band due to number of the slots and number of the magnetic poles, that is, vibration generated by imbalance of the magnetic force, cannot be reduced. Therefore, in general, vibration cannot be reduced by the structure provided with nine slots and eight poles, and the above structure is not used.

Furthermore, the cogging torque of the brushless DC motor provided with nine slots and eight poles is minimized compared to that of the brushless DC motor of which the ratio of the number of slots and the number of poles is 4:3, 3:4, 2:3 or 3:2. The order of the cogging torque is not the seventy-second which is a cycle calculated by applying the least common multiple, as is generally known, but is ninth. That is, the order of the cogging torque of the brushless DC motor provided with nine slots and eight poles is the sum of the cogging torques in which phases of the nine slots are cancelled as shown in FIG. 6A. The cogging torque generated by each of the magnetic poles in a magnetic circuit provided with nine slots and eight poles is defined as "T", which is calculated by the following formula.

$$T = A \sin\{9\theta + 5(n-1)\}$$

In the above formula, referring numeral defined as "n" is the number of poles (1 to 8) and reference symbol defined as "A" is a magnetic force of each pole.

According to the above formula, in the brushless DC motor having the structure shown in FIG. 5, the direction of the force of the cogging torque generated by an arbitrary pole is symmetrically reversed with respect to the Y axis, whereby the cogging torque is cancelled, so that the cogging torque is minimized. However, in actuality, errors such as misalignment of coaxiality and misalignment of magnetizing pitch occur, so that the gap between the permanent magnet of the rotor and the pole face of the pole tooth is not uniform, whereby the magnetic force cannot be cancelled. Therefore, as is shown by the dashed line in FIG. 6B, cogging torque is increased.

In view of the above circumstances, an object of the present invention is to provide a technique for stably obtaining a minimized cogging torque in a brushless DC motor provided with nine slots and eight poles.

According to a first aspect of the present invention, the brushless DC motor provided with nine slots and eight poles includes a stator including a stator core having pole teeth on an outer circumference thereof and a coil wound around each pole tooth; a rotor disposed at an outside position of the outer circumference of the stator via a gap and having a multiply magnetized permanent magnet with plural magnetic poles; a pole tooth surface formed at a pole tip of the pole tooth and facing an inner circumference of the rotor; a recessed portion formed on the pole tooth surface; a slot formed between the adjacent pole teeth and extending in a first angular range around a rotational center of the rotor; in which the recessed portion extends in a second angular range around the rotational center of the rotor, the second angular range is 1.2 to 3.0 times the first angular range, the recessed portion has a radial depth which is 0.5% or more of an inner diameter of the permanent magnet, the pole tooth extends in a third angular range around a rotational center of the rotor, the third angular range is 0.58 to 0.8 times a value which is obtained by dividing 360 degrees by number of magnetic poles of the permanent magnet. It should be noted that the inner diameter defined as "d" of the permanent magnet facing the stator is set beyond 20 mm.

According to the first aspect of the present invention, in the brushless DC motor, the recessed portion is formed on the pole tooth surface facing the inner circumferential surface of the rotor, and the slot formed between the adjacent pole teeth and extending in the first angular range around the rotational center of the rotor in which the recessed portion extends in the second angular range around the rotational center of the rotor, the second angular range is 1.2 to 3.0 times the first angular range and the pole tooth extends in the third angular range around the rotational center of the rotor, the third angular range is 0.58 to 0.8 times a value which is obtained by dividing 360 degrees by number of magnetic poles of the permanent magnet, so that the stably minimized cogging torque can be obtained.

According to a second aspect of the present invention includes a stator including a stator core having pole teeth on an outer circumference thereof and a coil wound around each pole tooth; a rotor disposed at an outside position of the outer circumference of the stator via a gap and having a multiply magnetized permanent magnet with plural magnetic poles; a pole tooth surface formed at a pole tip of the pole tooth and facing an inner circumference of the rotor; a flat portion formed on the pole tooth surface; and a slot formed between the adjacent pole teeth and extending in a first angular range around a rotational center of the rotor; and in which the flat portion extends in a fourth angular range around the rotational center of the rotor, the fourth angular range is 1.2 to 3.0 times the first angular range, the pole tooth extends in a third angular range around a rotational center of the rotor, the third angular range is 0.58 to 0.8 times a value which is obtained by dividing 360 degrees by number of magnetic poles of the permanent magnet. According to the second aspect of the present invention, substantially the same effects can be obtained as in the case in which the recessed portion is formed.

According to a third aspect of the present invention, the recessed portion of the pole tooth has a bottom surface, the bottom surface has a radialmost surface on a portion except for the recessed portion, the bottom surface and the radialmost surface are circular and coaxial with each. According to the third aspect of the present invention, a brushless DC motor in which the circumferential balance is maintained and the cogging torque is reduced is provided.

According to the present invention, a technique for stably obtaining the minimized cogging torque in the brushless DC motor provided with nine slots and eight poles is provided. Furthermore, since the cogging torque is reduced, the motor can be reduced a noise as compared with the conventional motor.

DETAILED DESCRIPTION OF THE PREFERRED EMBODIMENTS

Figure 1A:
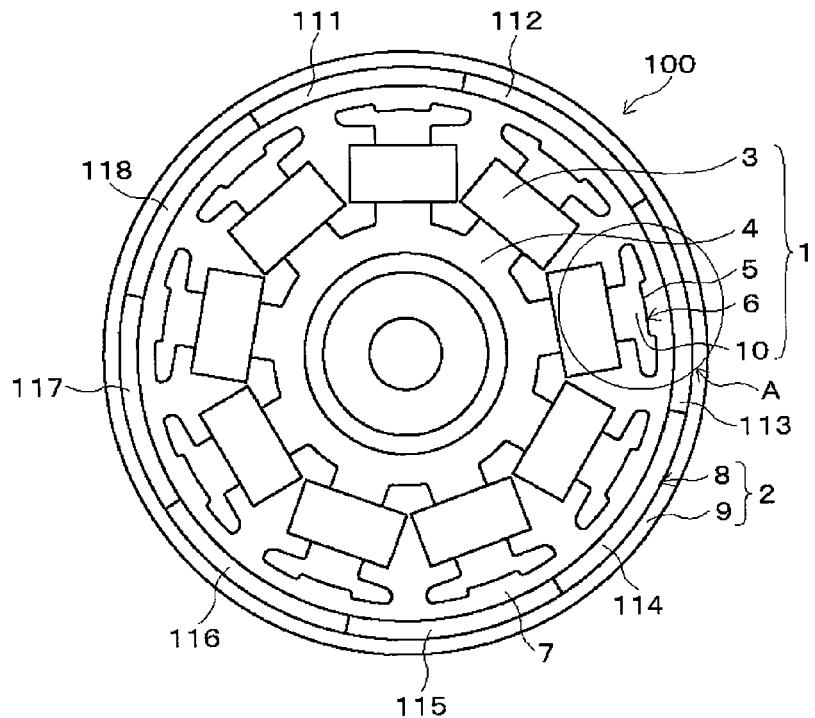
FIG. 1A is a cross-sectional view of a brushless DC motor in accordance with an embodiment of the present invention.
Figure 1B:
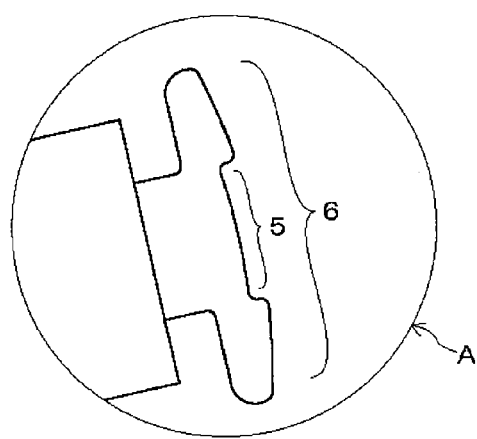
FIG. 1B is an enlarged view (permanent magnet and rotor yoke not shown) of the portion A in FIG. 1A
Figure 2:
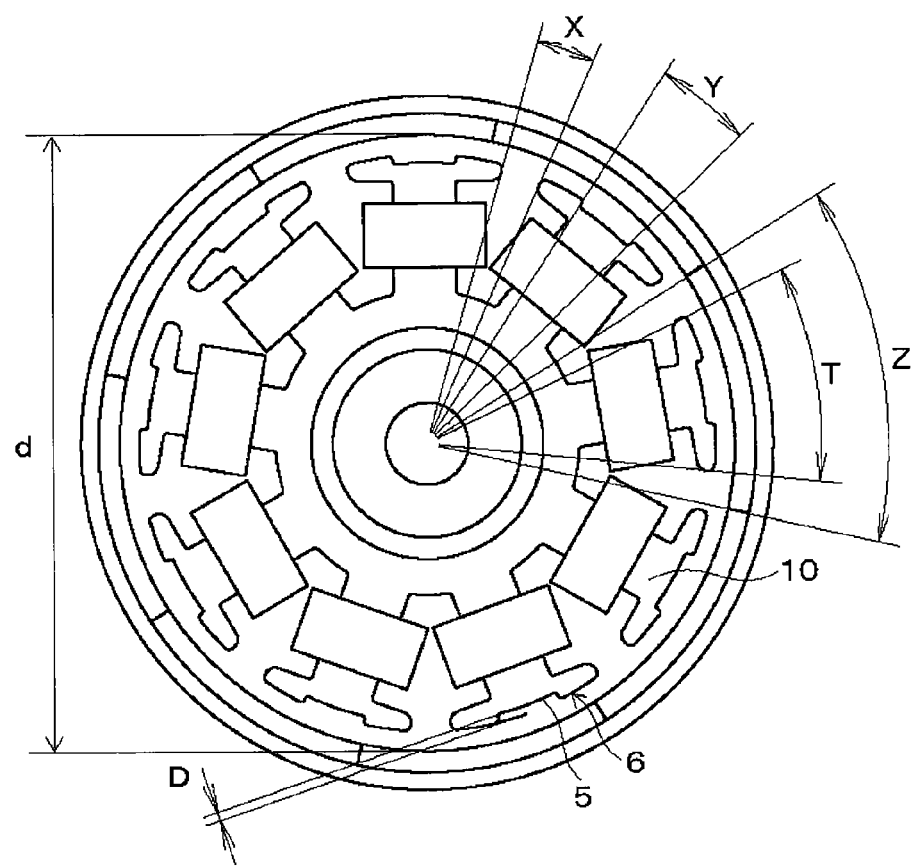
FIG. 2 is a cross-sectional view showing relationships of restricted parameters in the brushless DC motor in accordance with an embodiment of the present invention.

An example of an embodiment of a brushless DC motor of the present invention is explained hereinafter. FIG. 1A is a cross-sectional view as viewed from the axis of rotation of the brushless DC motor in accordance with an embodiment of the present invention. FIG. 1B is an enlarged view of the portion A in FIG. 1A. FIG. 2 is a cross-sectional view showing relationships of parameters described below in the brushless DC motor of the present embodiment. A brushless DC motor 100 provided with nine slots and eight poles is shown in FIGS. 1A and 1B. The brushless DC motor 100 is the outer-rotor-type brushless DC motor including a stator 1 at the inside thereof and a rotor 2 rotating with respect to the stator 1 at the outside thereof.

The brushless DC motor 100 is provided with the stator 1. The stator 1 is provided with a stator core 4 composed of plural plates of soft magnetic iron. The stator core 4 is provided with nine pole teeth 10 extended toward a radial direction. Each pole tooth 10 is wound therearound by a stator coil 3. A front end portion of the pole tooth 10 has an expanded bevel structure in side view, whereby a pole tooth surface 6 is formed. In the pole tooth surface 6, the outer most circumferential surface except for a recessed portion 5 described below has a structure shaped along the circumferential surface having an axis of rotation as a center, and is positioned facing to an inner circumferential surface of a permanent magnet 8 having a cylindrical shape via a gap. The permanent magnet 8 is composed of eight magnetic poles 111 to 118 which are magnetized so that the polarity thereof is alternately inversed. The permanent magnet 8 composes a rotor 2 with a rotor yoke 9. A recessed portion 5 is formed on the pole tooth surface 6 of the pole tooth 10. Inner bottom surfaces of the nine recessed portions 5 are curved along the circumferential surface having the axis of rotation as the center, whereby distances between the inner bottom surfaces of the recessed portions 5 and the inner circumferential surface of the rotor 2 are constant. According to this structure, the outermost circumferential surfaces of the nine pole teeth 10 and the surface of the inner bottoms of the nine recessed portions 5 are positioned on different circles which are coaxial with each other.

The recessed portion 5 is radially recessed toward the center and is axially extended. The width of the recessed portion 5 when viewed from the axial direction is set at a value satisfying the relationship of dimensions explained hereinafter. As is shown in FIG. 2, in a case in which the circumferential dimension of the recessed portion 5 when viewed from the rotational center is counted as a range of angle (hereinafter referred to as "angular range"), the value thereof is defined as "Y". When the distance of a slot between the front end portions of the adjacent pole teeth 10 is counted as the angular range in the same way as in the above case of "Y", the value thereof is defined as "X". "Y" is 1.2 to 3.0 times "X". The radial depth of the recessed portion 5 defined as "D" is 0.5% or more of an inner diameter of the permanent magnet 8 defined as "d". It should be noted that the properties of the structure to which is applied the present invention are greatly improved when the inner diameter of the permanent magnet 8 facing an outer diameter of the stator 1 is 20 mm or more. When the dimension of the pole tooth 10 when viewed from the center is counted as the angular range in the same way as the above and is defined as "T", the value thereof is set at 0.58 to 0.8 times the angle "Z" by dividing 360 degrees by number of magnetic poles of the permanent magnet 8. When the depth of the recessed portion 5 is increased to interfere with the stator coil 3, the effect of providing the recessed portion 5 may be saturated. Therefore, the upper limit of "D" is less than the dimension by which the stator coil 3 is interfered.

The rotor 2 is disposed at the outside position of the outer circumference of the stator 1 via the gap. The rotor 2 is provided with the permanent magnet 8 that is multiply magnetized and the rotor yoke 9, and is connected to a shaft (not shown). The shaft is rotatably held by a housing (not shown) of the brushless DC motor 100 via a bearing (not shown). On the other hand, the stator 1 is fixed to the housing. By this structure, the rotor 2 is rotatable with respect to the stator 1.

As explained in the above, the brushless DC motor 100 is provided with the pole tooth 10 including the stator core 4 having the stator coil 3 wound around the outer circumference thereof and the pole tooth surface 6 is formed at a position thereof facing the inner circumferential surface of the rotor 2. The recessed portion 5 is formed on the pole tooth surface 6. The slot is formed between the adjacent pole teeth 10 and extends in a first angular range around the rotational center of the rotor 2. The recessed portion 5 extends in a second angular range around the rotational center of the rotor 2, and the second angular range is 1.2 to 3.0 times the first angular range. Furthermore, the recessed portion 5 has a radial depth "D" which is 0.5% or more of the inner diameter "d" of the permanent magnet 8, and the pole tooth 10 extends in a third angular range around the rotational center of the rotor 2, the third angular range is 0.58 to 0.8 times the value which is obtained by dividing 360 degrees by the number of the magnetic poles of the permanent magnet 8.

Figure 5:
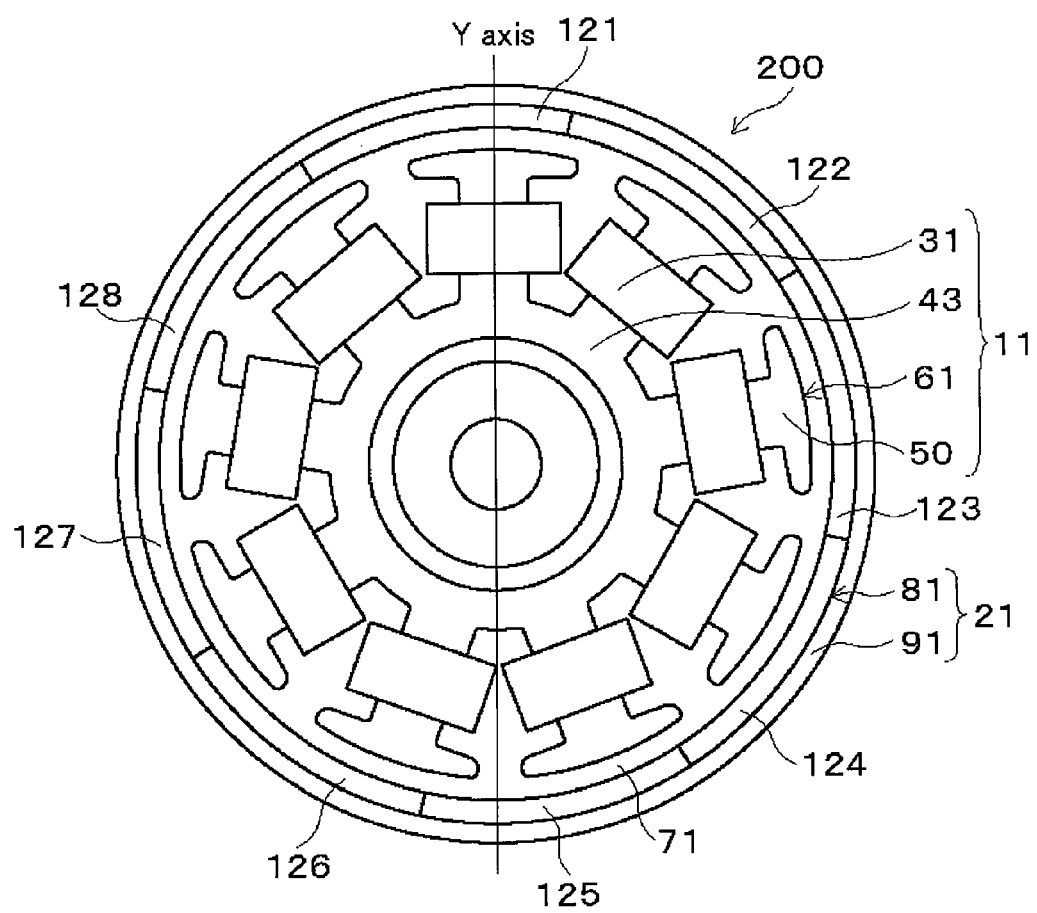
FIG. 5 is a cross-sectional view of the brushless DC motor having a conventional structure.

FIG. 5 is a cross-sectional view showing the structure of a brushless DC motor 200 provided with a stator having nine slots and a rotor having eight poles in a conventional technique. The brushless DC motor 200 is provided with a stator 11. The stator 11 is provided with a stator core 43 having pole teeth 50 on the circumference thereof. The stator core 43 is wound around by a coil 31. A rotor 21 provided with a permanent magnet 81 having eight magnetized poles shown as magnetic poles 121 to 128 and a rotor yoke 91 is disposed at the outside position of an outer circumference of the stator 11 via a gap. The rotor 21 is connected to a shaft (not shown), and is rotatable via a bearing (not shown). In the brushless DC motor 200, a pole tooth surface 61 is not provided with a recessed portion, but is the cylindrical surface of which the center coincides with the rotational axis of the rotor 21.

Figure 1C:
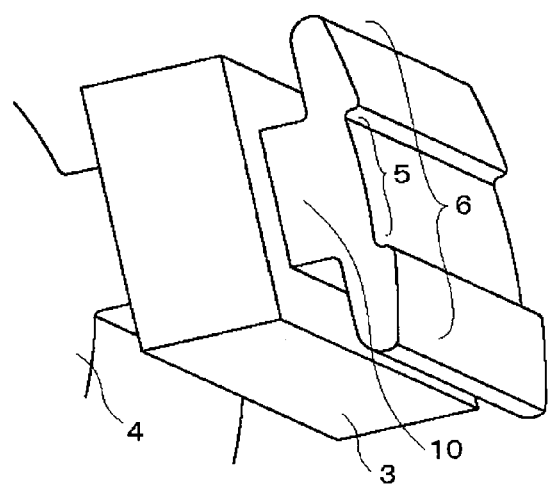
FIG. 1C is a schematic view of the portion A.
Figure 6A:
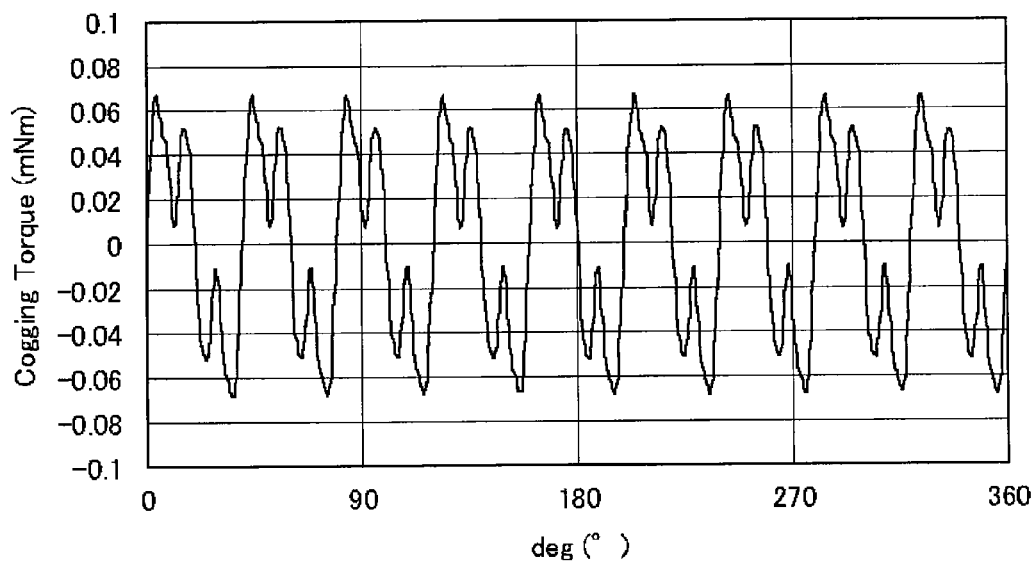
FIG. 6A is a graph showing a cogging torque of the brushless DC motor to which a conventional technique was applied in a condition in which misalignment of coaxiality and misalignment of pole pitch do not occur.
Figure 6B:
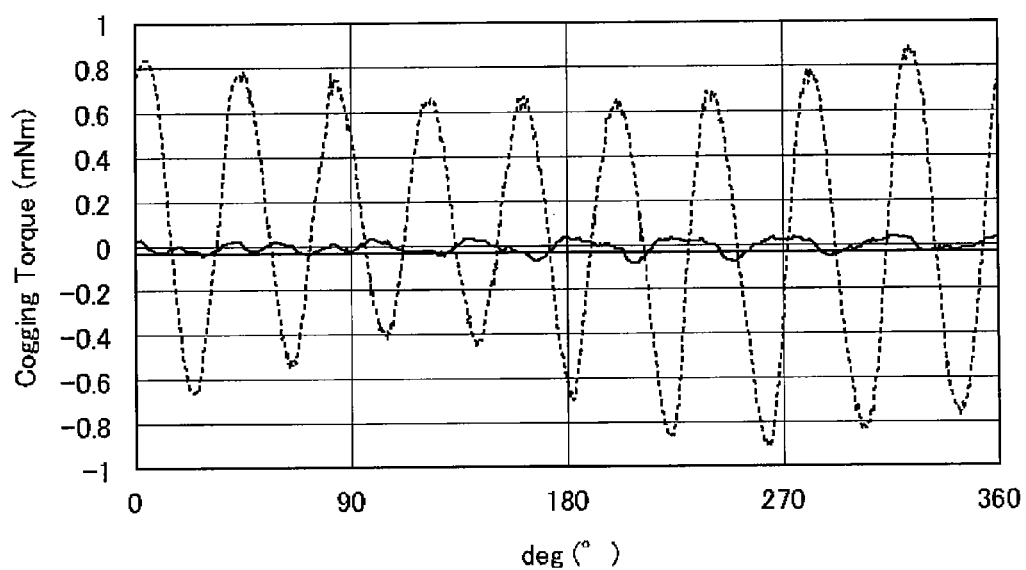
FIG. 6B is a graph showing modifications of the cogging torques of the brushless DC motor of the present embodiment and the brushless DC motor in a conventional technique.

According to the present invention, increase of cogging torque caused by error such as misalignment of coaxiality can be avoided. As shown in FIG. 1, the recessed portion 5 is provided to the stator core 4 and is applied with an appropriate dimension, so that triple effects for reducing the cogging torque can be obtained. That is, the cogging torque can be symmetrically canceled with respect to the Y axis, as is explained referring to FIG. 5. The cogging torque can be reduced by applying the pole tooth 10 thereto as shown in FIG. 1. Furthermore, the cogging torque can also be reduced by reversing phases between magnetic poles 112 and 114 and between magnetic poles 116 and 118. Therefore, the minimized cogging torque can be stably obtained, as is shown by the solid line in the graph in FIG. 6B. In FIG. 6B, a graph with the rotation angle on the horizontal axis and with the cogging torque on the vertical axis is shown. The solid line shows the measured data in the brushless DC motor 100 of the present embodiment and the dashed-line shows the measured data in the brushless DC motor 200 for the comparison shown in FIG. 5 having substantially the same structure as that of the present embodiment except that the recessed portion 5 of the present invention is not formed and the outer circumference of the pole tooth surface 6 of the stator 1 is formed along a cylindrical surface. As is clearly shown in FIG. 6B, by providing the recessed portion 5, increase of the cogging torque can be greatly inhibited, and stable properties of the motor can be obtained.

Figure 7:
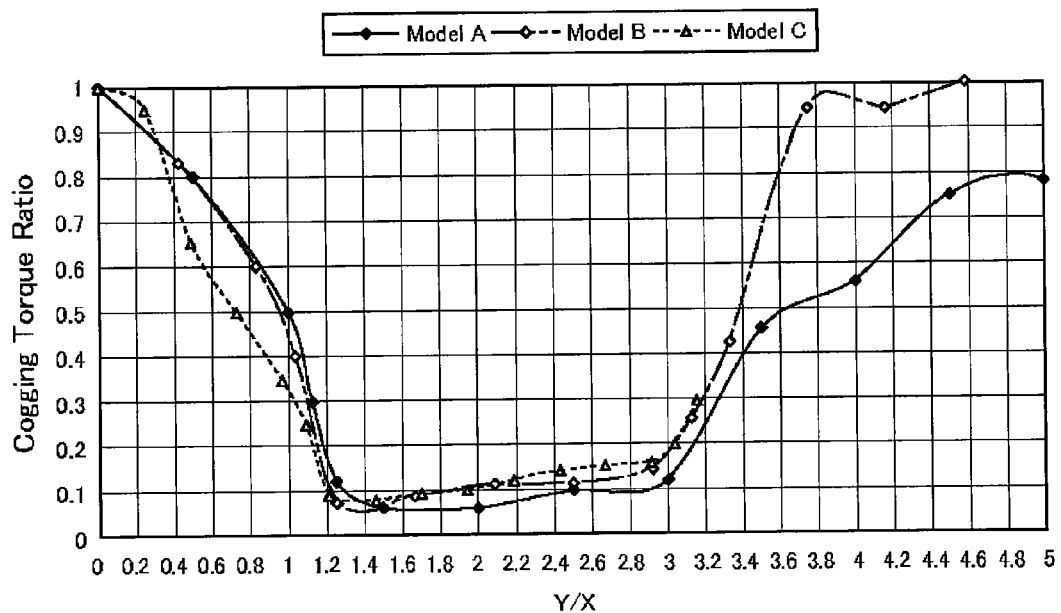
FIG. 7 is a graph showing a relationship between a ratio of the cogging torque and a calculated value Y/X ("Y" is an angular range of a recessed portion on a surface of a pole tooth and "X" is the angular range of a slot between adjacent pole teeth).

In FIG. 7, the graph with the calculated value of the formula Y/X on the horizontal axis, and with the cogging torque ratio on the vertical axis, is shown. In the above formula, "X" is the circumferential angular range of the distance between the adjacent pole teeth 10 when viewed from the axis of rotation and "Y" is the circumferential angular range of the recessed portion 5 of the pole tooth surface 6 when viewed from the same direction. The relationship between "X" and "Y" is shown in FIG. 2. The cogging torque ratio in FIG. 7 is a parameter that is defined such that the cogging torque, in a case in which it is applied to the recessed portion, is divided by the cogging torque, in a case in which it is not applied to the recessed portion. According to this definition, when the value on the horizontal axis is zero, the ratio of the cogging torque is 1. In this case, the cogging torque is smaller as the cogging torque ratio is lower. As is clearly shown in FIG. 7, when the value Y/X is approximately 1.2 to 3.0, the cogging torque ratio is low. That is, as shown in FIG. 7, it is important in obtaining the low cogging torque that the circumferential angular range of the recessed portion 5, which faces the inner circumference of the rotor 2, on the pole tooth surface 6 of the pole teeth 10 of the stator 1 is set within 1.2 to 3.0 times the circumferential angular range of the distance between the adjacent pole tooth 10. The data of model A, model B, and model C in which the outer diameters of motors are different from each other are shown in FIG. 7.

In each model, the cogging torque ratio is low when the value Y/X is approximately 1.2 to 3.0.

Figure 8:
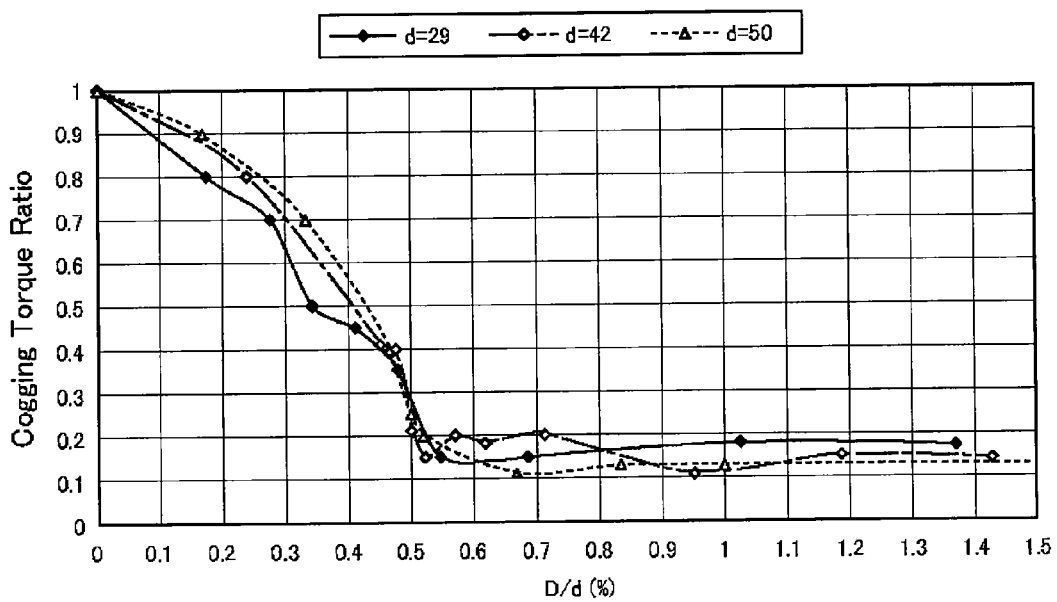
FIG. 8 is a graph showing a relationship between the ratio of the cogging torque and the calculated value D/d ("D" is a depth of the recessed portion on an outer circumferential surface of the pole tooth, and "d" is an inner diameter of a permanent magnet).

The depth of the recessed portion 5 of the pole tooth surface 6 is defined as "D" and the radial inner diameter of the permanent magnet 8 is defined as "d". In the graph of FIG. 8, D/d is applied on the horizontal axis, and the cogging torque ratio is applied on the vertical axis. In FIG. 8, the cogging torque ratio is defined as follows. That is, the cogging torque of the subject sample in which the value D is varied is divided by the value of the cogging torque when the calculated value D/d is zero (that is, the recessed portion is not provided). In this case, the cogging torque is smaller as the ratio is lower. The cogging torque ratio is 1 when the value on the horizontal axis is zero. According to FIG. 8, the cogging torque ratio was very small when the depth of the recessed portion 5 defined as "D" is 0.5% or more of the radial inner diameter of the permanent magnet 8. Therefore, setting the depth of the recessed portion 5 at 0.5% or more of the radial inner diameter of the permanent magnet 8 is effective in reducing the cogging torque.

Figure 9:
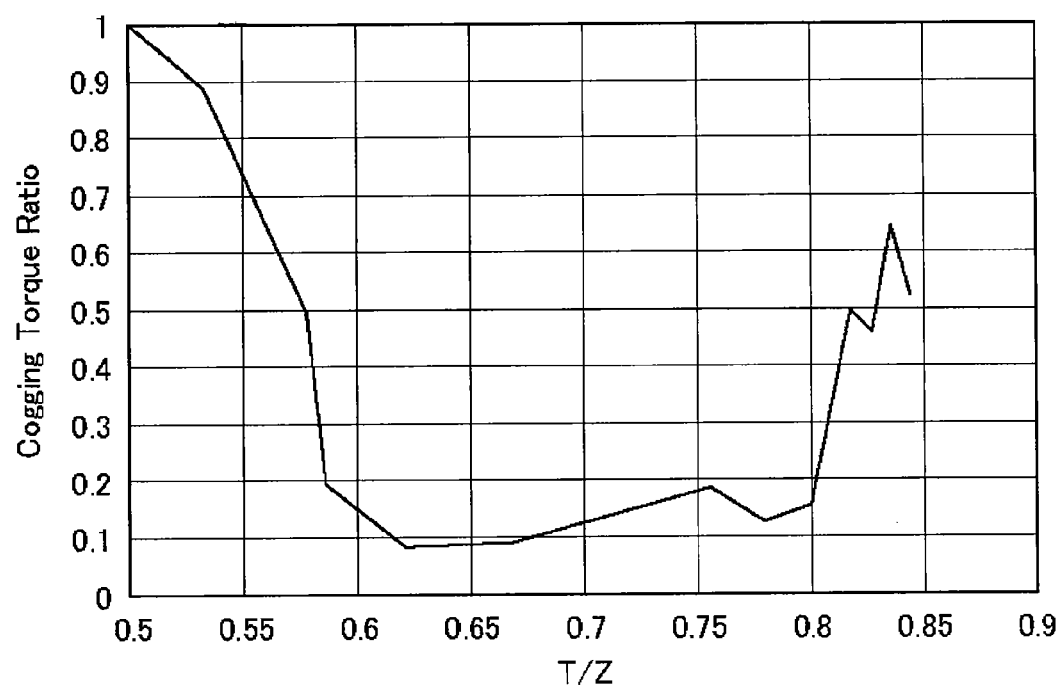
FIG. 9 is a graph showing a relationship between the ratio of the cogging torque and the calculated value T/Z ("T" is the angular range of the pole tooth and "Z" is the angular range of the permanent magnet).

When the angle obtained by dividing 360 degrees by the number of the magnetic poles of the permanent magnets 8 is defined as "Z" and the circumferential angular range of the pole tooth 10 is defined as "T", the value T/Z is applied on the horizontal axis, and the cogging torque ratio is applied on the vertical axis in the graph in FIG. 9. The relationship between the reference symbols T and Z is shown in FIG. 2. The cogging torque in FIG. 9 is defined by "TR1/TR2", wherein the cogging torque of the subject sample having the varied value T/Z is defined as "TR1" and the cogging torque when the value T/Z is 0.5 is defined as "TR2". In this case, the cogging torque is smaller as the cogging torque ratio is lower. The cogging torque ratio is 1 when the value on the horizontal axis is 0.5. According to the graph in FIG. 9, the cogging torque ratio is low when the value of the formula T/Z is approximately 0.58 to 0.8. That is, the angular range of the pole tooth 10 is set at 0.58 to 0.8 times the angle Z obtained by dividing 360 degrees by number of the magnetic poles of the permanent magnet 8.

Figure 3:
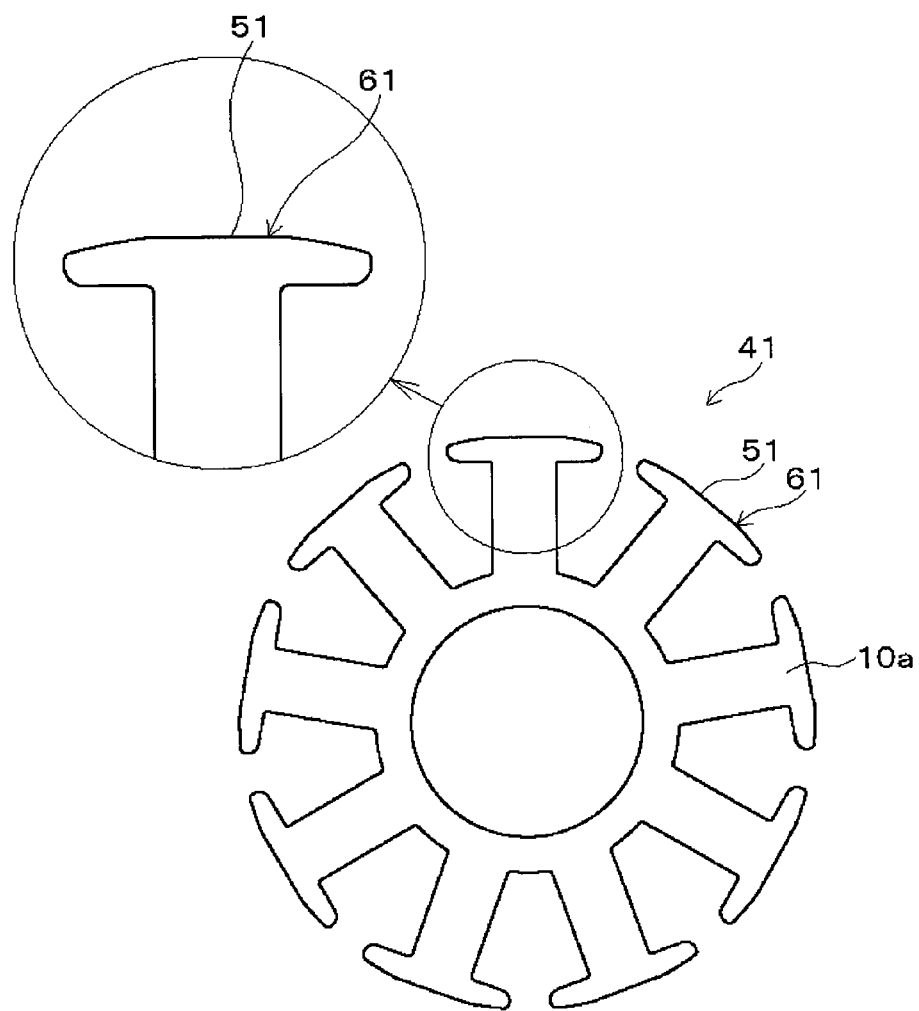
FIG. 3 is a cross-sectional view showing a structure of a stator core of the brushless DC motor in accordance with the first modification of the embodiment of the present invention.

A first variation of the present embodiment is shown in FIG. 3.

A stator core 41 is shown in FIG. 3. In the stator core 41, a pole tooth 10a is provided with a flat portion 51. The center in the circumferential direction of the flat portion 51 is most remote from an inner circumferential surface of a rotor (not shown) and the flat portion 51 extends straight from the center to both ends thereof. The circumferential angular range Y of the flat portion 51 in this case is equivalent to the angular range of the recessed portion in the first aspect of the present invention.

Figure 4A:
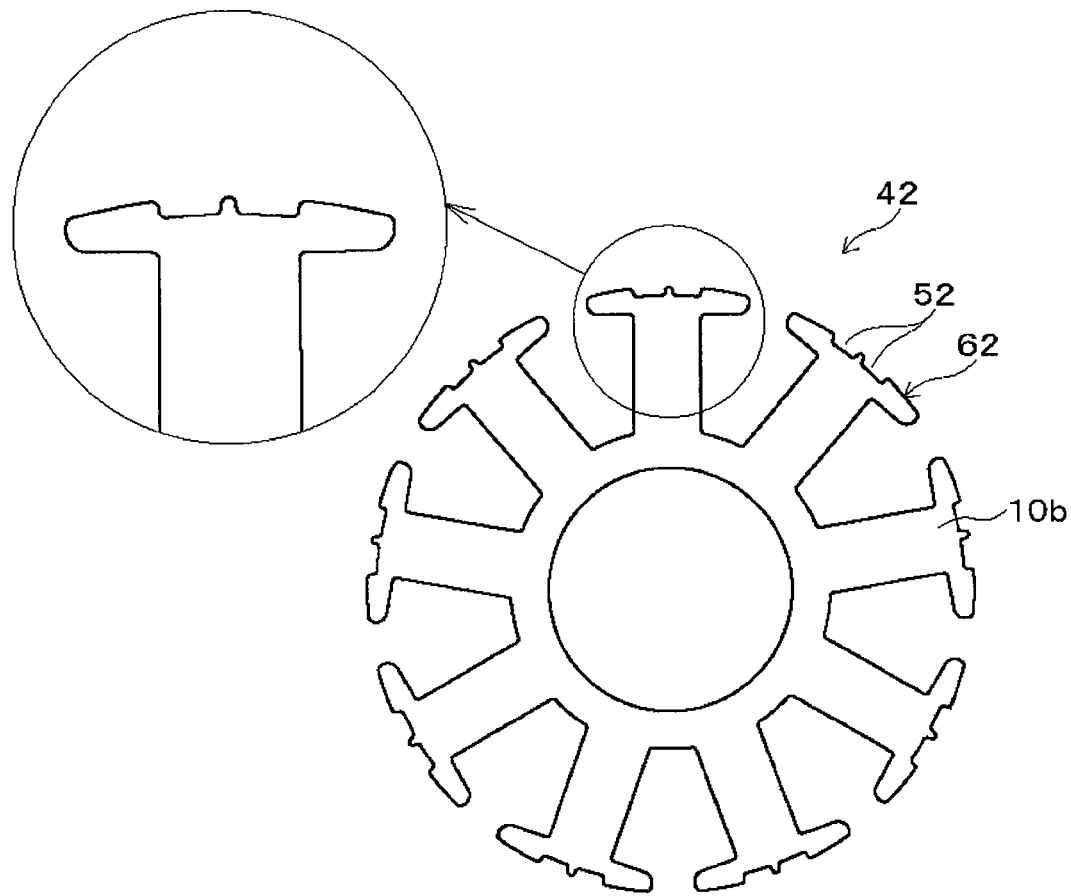
FIG. 4A is a cross-sectional view showing the structure of the stator core of the brushless DC motor in accordance with the second modification of the embodiment of the present invention and FIG. 4B is an enlarged schematic view showing the structure of a portion of the stator core.
Figure 4B:
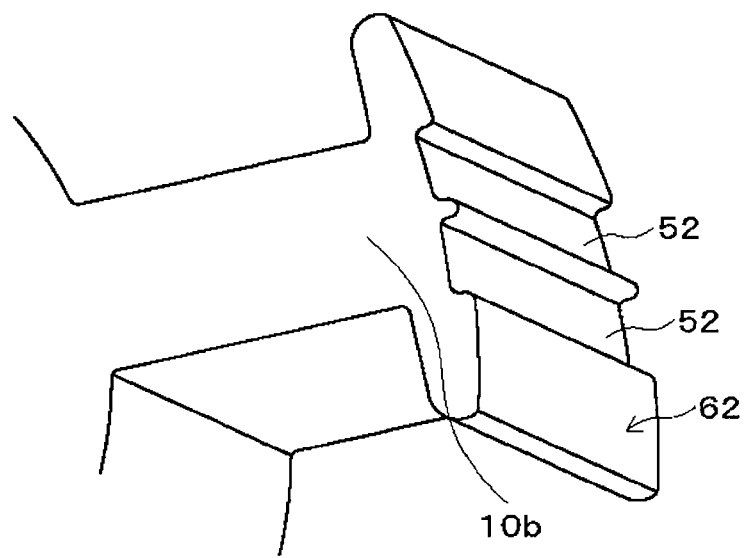

A second variation of the present embodiment is shown in FIGS. 4A and 4B. A stator core 42 is shown in FIGS. 4A and 4B. The stator core 42 is provided with a pole tooth 10b having a recessed portion 52 which is separated into two portions, whereby the structure is formed by a pair of the two recessed portions. In this case, the circumferential angular range Y of the recessed portion 52 of a pole tooth surface 62 is taken by the angle of the circumferential distance between both of the circumferential outer edges of a pair of the two recessed portions.

The present invention is not limited to the above embodiments and includes modifications that will be obvious to those skilled in the art, and the effects of the invention are not restricted to those of the above embodiments. That is, various additions, modifications, and partial omissions are possible within the scope of the concept of the invention and the objects of the invention, as claimed, and equivalents thereof. For example, the present invention may also be applied to inner-rotor-type motors.

What is claimed is:

1. A brushless motor comprising:
    a stator comprising a stator core having nine pole tooth portions arranged in a circular array separated from each other by slots located between the pole tooth portions and coils wound around the pole tooth portions, respectively, wherein each of the pole tooth portions has a circumferentially extended pole tooth surface portion at a tip portion thereof, wherein the pole tooth surface portion is curved along an arc; and
    a rotor comprising a permanent magnet having eight magnetic poles disposed alternately in a circumferential direction and facing the pole tooth surface portion via an air gap,
    wherein each pole tooth surface portion has a recessed portion at a portion facing the rotor,
    wherein a ratio of (i) an angle of the recessed portion with respect to a rotational center of the rotor and (ii) an angle of the slot located between the pole tooth portions with respect to the rotational center of the rotor is set in a range of 1.2 to 3.0,
    wherein the recessed portion has a radial depth which is 0.5% or more of an inner diameter of the permanent magnet, and
    wherein a ratio of (i) an angle of the pole tooth surface portion with respect to the rotational center of the rotor and (ii) an angle of the magnetic pole of the permanent magnet with respect to the rotational center of the rotor is set in a range of 0.58 to 0.8.

2. A brushless motor comprising:
    a stator comprising a stator core having nine pole tooth portions arranged in a circular array separated from each other by slots located between the pole tooth portions and coils wound around the pole tooth portions, respectively, wherein each of the pole tooth portions has a circumferentially extended pole tooth surface portion at a tip portion thereof, wherein the pole tooth surface portion is curved along an arc; and
    a rotor comprising a permanent magnet having eight magnetic poles disposed alternately in a circumferential direction, and facing the pole tooth surface portion via an air gap,
    wherein each pole tooth surface portion has a flat portion at a portion facing the rotor,
    wherein a ratio of (i) an angle of the flat portion with respect to a rotational center of the rotor and (ii) an angle of the slot located between the pole tooth portions with respect to the rotational center of the rotor is set in a range of 1.2 to 3.0, and
    wherein a ratio of (i) an angle of the pole tooth surface portion with respect to the rotational center of the rotor and (ii) an angle of the magnetic pole of the permanent magnet with respect to the rotational center of the rotor is set in a range of 0.58 to 0.8.

3. A brushless motor according to claim 1, wherein the recessed portion has a bottom surface portion which is curved along an arc, and a center of a radius of curvature of the bottom surface portion of the recessed portion is equal to a center of a radius of curvature of the pole tooth surface portion.

4. A brushless motor according to claim 1, wherein the rotor is disposed outside the stator in a radial direction.

5. A brushless motor according to claim 1, wherein the rotor is disposed inside the stator in a radial direction.

6. A brush less motor according to claim 2, wherein the rotor is disposed outside the stator in a radial direction.

7. A brushless motor according to claim 2, wherein the rotor is disposed inside the stator in a radial direction.

* * * * *